(12) United States Patent
Huang et al.

(10) Patent No.: US 8,624,873 B2
(45) Date of Patent: Jan. 7, 2014

(54) METHOD FOR DETECTING TOUCH SPOTS OF TOUCH PANEL

(75) Inventors: Chun-Lung Huang, New Taipei (TW); Chien-Yung Cheng, New Taipei (TW); Po-Yang Chen, New Taipei (TW); Po-Sheng Shih, New Taipei (TW)

(73) Assignee: Shih Hua Technology Ltd., Zhubei, Hsinchu County (TW)

( * ) Notice: Subject to any disclaimer, the term of this patent is extended or adjusted under 35 U.S.C. 154(b) by 179 days.

(21) Appl. No.: 13/340,581

(22) Filed: Dec. 29, 2011

(65) Prior Publication Data

US 2013/0057504 A1    Mar. 7, 2013

(30) Foreign Application Priority Data

Sep. 5, 2011    (TW) .................................. 100131988

(51) Int. Cl.
*G06F 3/041*    (2006.01)
(52) U.S. Cl.
USPC .......................................... 345/174; 345/173

(58) Field of Classification Search
USPC ...................... 345/173–179; 178/18.01–18.04
See application file for complete search history.

(56) References Cited

U.S. PATENT DOCUMENTS

2006/0097991 A1*  5/2006  Hotelling et al. ............. 345/173
2012/0306808 A1* 12/2012  Huang et al. .................. 345/174

* cited by examiner

*Primary Examiner* — Kent Chang
*Assistant Examiner* — Nelson Rosario
(74) *Attorney, Agent, or Firm* — Altis Law Group, Inc.

(57) ABSTRACT

A method for detecting a touch spot of the touch panel includes the following steps. The electrode pairs are scanned along the impedance direction for determining a first coordinate. A number of electrode pairs near the first coordinate are selected to obtain an electrode pair signal. The first driving electrodes of the selected electrode pairs are scanned to obtain a first signal. The second driving electrodes of the selected electrode pairs are scanned to obtain a second signal. A second coordinate is determined according to the electrode pair signal, first signal, and second signal. Finally, the touch spot is determined according to the first coordinate, and second coordinate.

19 Claims, 18 Drawing Sheets

METHOD FOR DETECTING TOUCH SPOTS OF TOUCH PANEL

CROSS-REFERENCE TO RELATED APPLICATIONS

This application claims all benefits accruing under 35 U.S.C. §119 from Taiwan Patent Application No. 100131988, filed on Sep. 5, 2011 in the Taiwan Intellectual Property Office, the disclosure of which is incorporated herein by reference.

BACKGROUND

1. Technical Field

The present disclosure relates to a method for detecting a touch spot of a touch panel.

2. Description of Related Art

Touch sensing technology is capable of providing a natural interface between an electronic system and a user, and has found widespread applications in various fields, such as mobile phones, personal digital assistants, automatic teller machines, game machines, medical devices, liquid crystal display devices, and computing devices.

There are different types of touch panels, such as a capacitive touch panel. Capacitive touch panels including transparent conductive films are widely used in various fields due to their high sensitivity. However, the resistance distribution of the transparent conductive film is not uniform so the precision in detecting a touch spot is affected.

What is needed, therefore, is to provide a method for detecting a touch spot of a touch panel, which can overcome the above-described shortcomings.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
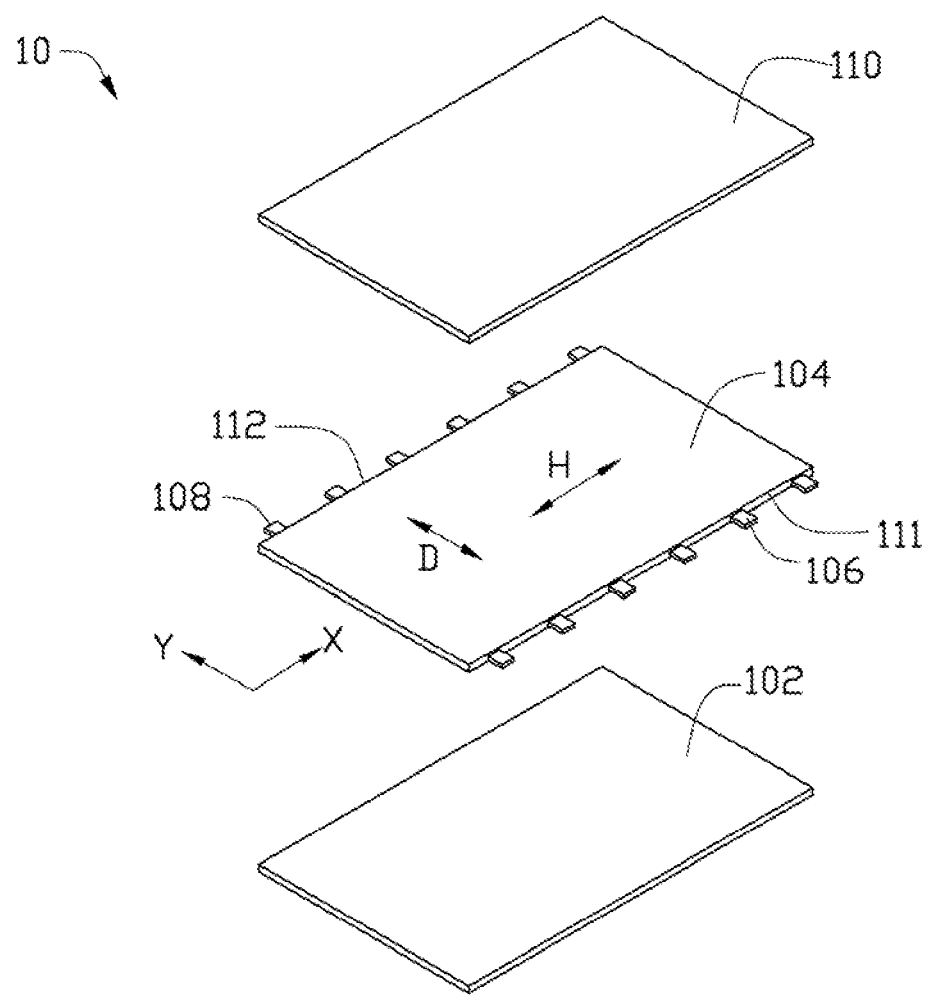
FIG. 1 is a schematic view of one embodiment of a touch panel.

According to one embodiment, a touch panel 10 as illustrated in FIG. 1 includes a substrate 102, a transparent conductive film 104 with anisotropic impedance, a number of first driving electrodes 106, a number of second driving electrodes 108, and a transparent cover layer 110. The transparent conductive film 104 defines a first impedance direction H and a second impedance direction D substantially perpendicular to the first impedance direction H due to the anisotropic impedance. Furthermore, the transparent conductive film 104 includes a first side 111 and a second side 112 opposite to the first side 111. The first side 111 and the second side 112 are substantially parallel to the first impedance direction H. The first driving electrodes 106 are disposed at the first side 111 of the transparent conductive film 104 with a regular interval and electrically connected to the transparent conductive film 104. Similarly, the second driving electrodes 108 are disposed at the second side 112 of the transparent conductive film 104 with a regular interval and electrically connected to the transparent conductive film 104. The first impedance direction H is substantially parallel to an X axis shown in FIG. 1. The second impedance direction D is substantially parallel to a Y axis shown in FIG. 1.

Figure 2:
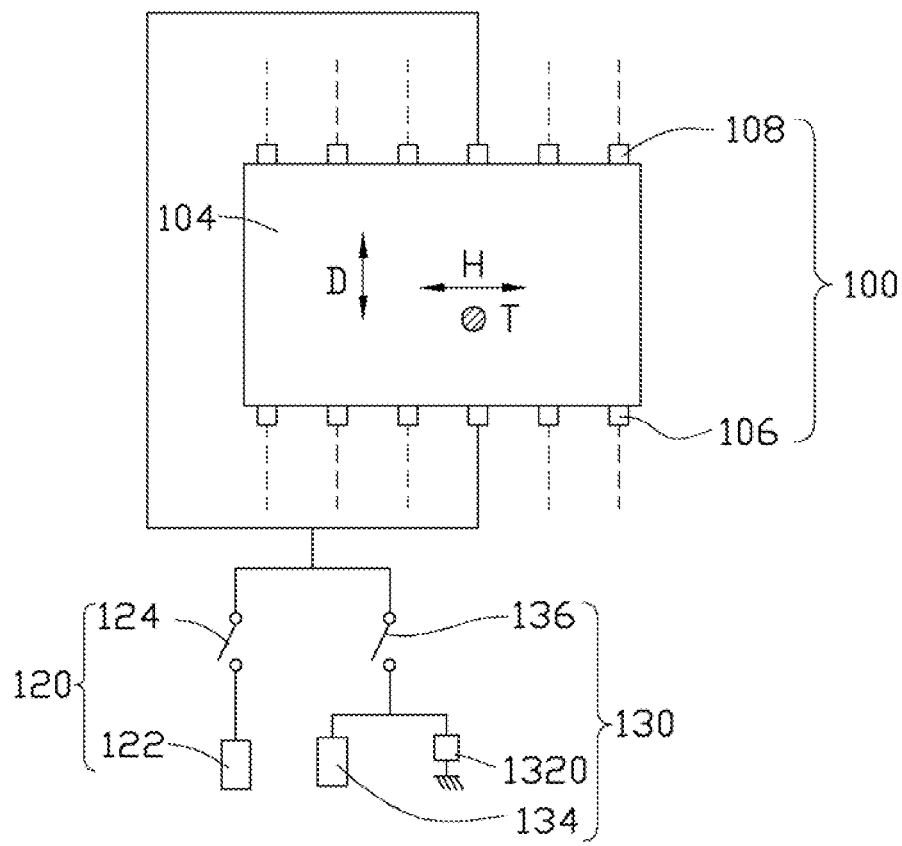
FIG. 2 is a schematic view of one embodiment of scanning an electrode pair of the touch panel shown in FIG. 1.

Referring to FIG. 2, the first driving electrodes 106 are respectively aligned with the second driving electrodes 108 to form a number of electrode pairs 100. The electrode pair 100 can be formed by one first driving electrode 106 and one second driving electrode 108, one first driving electrode 106 and two second driving electrodes 108, or two first driving electrodes 106 and one second driving electrode 108. In one embodiment, each of the electrode pairs 100 is formed by one first driving electrode 106 and one second driving electrode 108. The touch panel 10 further includes a driving circuit 120 and a sensing circuit 130. The driving circuit 120 and the sensing circuit 130 are electrically connected to the first driving electrodes 106 and the second driving electrodes 108 to detect a touch spot T of the touch panel 10.

The driving circuit 120 includes a charge circuit 122 and a first switch 124. The charge circuit 122 is controlled to separately connect or disconnect to or from the first driving electrodes 106 and the second driving electrodes 108 by the first switch 124. The sensing circuit 130 includes a storage circuit 1320, a readout circuit 134, and a second switch 136. The storage circuit 1320 is connected in parallel to the readout circuit 134. The storage circuit 1320 is controlled to separately connect or disconnect to or from the first driving electrodes 106 and the second driving electrodes 108 by the second switch 136. Similarly, the readout circuit 134 is also controlled to separately connect or disconnect to or from the first driving electrodes 106 and the second driving electrodes 108 by the second switch 136. A resistor (not shown) can be further connected in series to the storage circuit 1320. The storage circuit 1320 can be electrically connected to the ground by the resistor.

Figure 3:
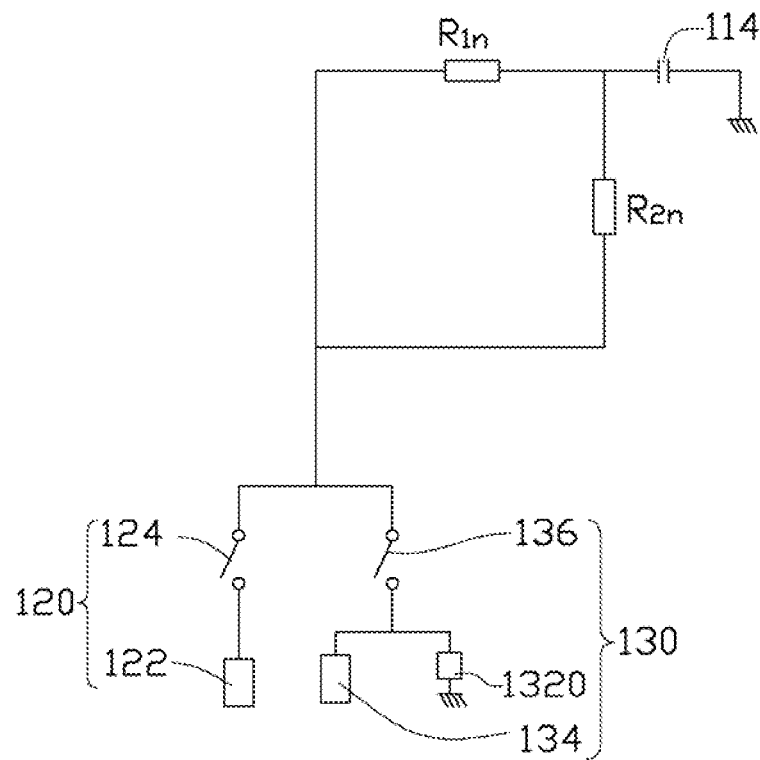
FIG. 3 is a circuit diagram of one embodiment of scanning the electrode pair of the touch panel shown in FIG. 1.

Referring to FIG. 3, when a conductive subject (not shown) is near or touches the touch panel 10, the touch spot T of the touch panel 10 and the conductive subject form a coupled capacitance 114 with a capacitance value C. The touch spot T of the touch panel 10 and the first driving electrodes 106 respectively form a number of resistance values $R_{11}$, $R_{12}, \ldots, R_{1n}$ (n=1, 2, 3 . . . ). The touch spot T of the touch panel 10 and the second driving electrodes 108 respectively form a number of resistance values $R_{21}, R_{22}, \ldots, R_{2n}$ (n=1, 2, 3 . . . ). The touch spot T of the touch panel 10 and the electrode pairs 100 respectively form a number of resistance values $R_1, R_2, \ldots, R_n$. A relationship between $R_n$, $R_{1n}$, and $R_{2n}$ satisfies a formula $$\frac{1}{R_{1n}} + \frac{1}{R_{2n}} = \frac{1}{R_n}.$$

In the formula, n is the number of the electrode pairs 100.

More specifically, the resistance values $R_{11}, R_{12}, \ldots, R_{1n}$ are different because the first driving electrodes 106 are disposed at different locations on the first side 111 of the transparent conductive film 104. The resistance value $R_{1n}$ formed by the touch spot T and the first driving electrodes 106 away from the touch spot T is much larger than the resistance value $R_{1n}$ formed by the touch spot T and the first driving electrodes 106 near the touch spot T. Similarly, the resistance values $R_{21}$, $R_{22}, \ldots, R_{2n}$ are different because the second driving electrodes 108 are disposed at different locations on the second side 112 of the transparent conductive film 104. The resistance value $R_{2n}$ formed by the touch spot T and the second driving electrodes 108 away from the touch spot T is much larger than the resistance value $R_{2n}$ formed by the touch spot T and the second driving electrodes 108 near the touch spot T.

The substrate 102 can be formed by transparent material, such as polyethylene (PE), polycarbonate (PC), polyethylene terephthalate (PET), polymethyl methacrylate (PMMA), glass, or quartz.

The transparent conductive film 104 is formed by a drawn carbon nanotube film which can be pulled/drawn from a carbon nanotube array. The drawn carbon nanotube film includes a number of successive and oriented carbon nanotubes joined end-to-end by van der Waals force therebetween. The drawn carbon nanotube film is a freestanding film, meaning that the drawn carbon nanotube film does not need to be supported by a substrate and can sustain the weight of itself when it is hoisted by a portion thereof without tearing. The drawn carbon nanotube film has minimum impedance along the stretching direction of the successive and oriented carbon nanotubes and maximum impedance along the direction substantially perpendicular to the stretching direction of the successive and oriented carbon nanotubes so as to have anisotropic impedance. In one embodiment, the first impedance direction H is the direction substantially perpendicular to the stretching direction of the successive and oriented carbon nanotubes. The second impedance direction D is substantially the stretching direction of the successive and oriented carbon nanotubes.

The first driving electrodes 106 and the second driving electrodes 108 can be formed by conductive material, such as metal, conductive polymer, conductive slurry, conductive glue, metallic carbon nanotubes, or indium tin oxide. The regular interval between two adjacent first driving electrodes 106 is in a range from about 3 millimeters to about 5 millimeters. Similarly, the regular interval between two adjacent second driving electrodes 108 is also in a range from about 3 millimeters to about 5 millimeters. A length of each of the first driving electrodes 106 and the second driving electrodes 108 substantially parallel to the first impedance direction H is in a range from about 1 millimeter to about 5 millimeters. A line between the first driving electrode 106 and the second driving electrode 108 of each of the electrode pairs 100 is substantially parallel to the second impedance direction D. In one embodiment, there are six first driving electrodes 106 disposed at the first side 111 of the transparent conductive film 104, and six second driving electrodes 108 disposed at the second side 112 of the transparent conductive film 104. The length of each of the first driving electrodes 106 and the second driving electrodes 108 is about 1 millimeter. The regular interval between two adjacent first driving electrodes 106 is about 3 millimeters, and the regular interval between two adjacent second driving electrodes 108 is about 3 millimeters. That is, the first driving electrodes 106 and the second driving electrodes 108 are arranged in a one by one manner.

The transparent cover layer 110 can be formed by transparent material, such as silicon nitride, silicon oxide, benzocyclobutene (BCB), polyester, or acrylic resin. Furthermore, the transparent cover layer 110 can be formed by a plastic film with surface hardening treatment, such as polyethylene terephthalate (PET) film, for protecting the transparent conductive film 104.

Figure 4:
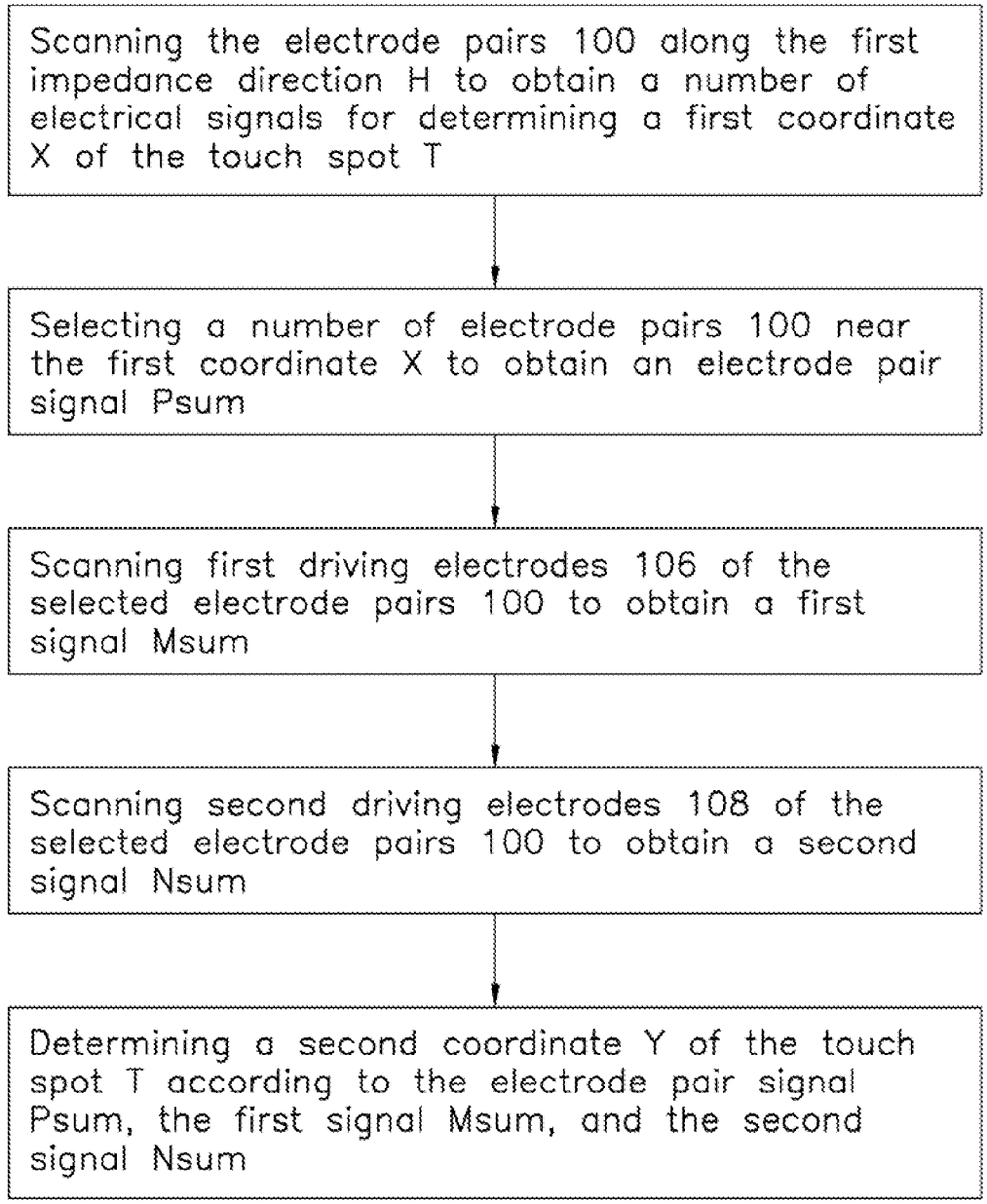
FIG. 4 is a flow chart of one embodiment of a method for detecting a touch spot of a touch panel.

Referring to FIG. 4, one embodiment of a method for detecting a touch spot T of a touch panel 10 includes:

(S1), scanning the electrode pairs 100 along the first impedance direction H to obtain a number of electrical signals for determining a first coordinate X of the touch spot T;

(S2), selecting a number of electrode pairs 100 near the first coordinate X to obtain an electrode pair signal $P_{sum}$;

(S3), scanning first driving electrodes 106 of the selected electrode pairs 100 to obtain a first signal $M_{sum}$;

(S4), scanning second driving electrodes 108 of the selected electrode pairs 100 to obtain a second signal $N_{sum}$; and (S5), determining a second coordinate Y of the touch spot T according to the electrode pair signal $P_{sum}$, the first signal $M_{sum}$, and the second signal $N_{sum}$.

In the step (S1), a method of scanning the electrode pairs 100 includes:

(S11), inputting a pulse signal into each of the electrode pair 100 by the driving circuit 120; and (S12), detecting a number of voltage values $V_{output}$ of the storage circuit 1320 by the sensing circuit 130 to obtain a number of resistance-capacitance values $R_nC$, and imitating an electrical signal curve according to the resistance-capacitance values $R_nC$;

(S13), determining the first coordinate X of the touch spot T according to the electrical signal curve along the first impedance direction H.

Figure 5:
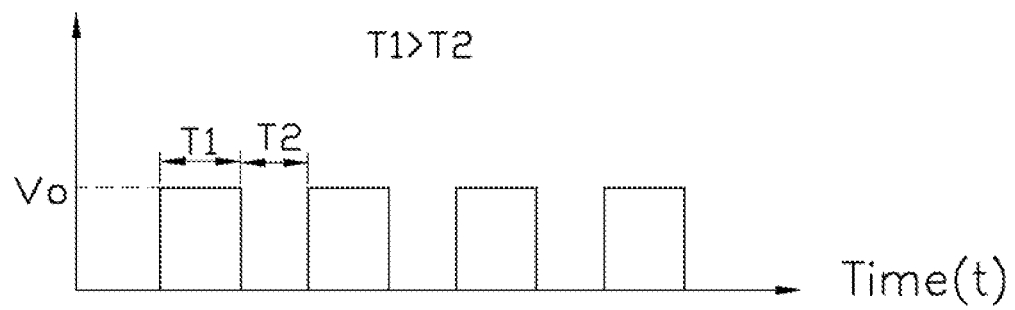
FIG. 5 is a waveform chart of voltage-time curves of inputting pulse signals into the touch panel shown in FIG. 1.
Figure 5:
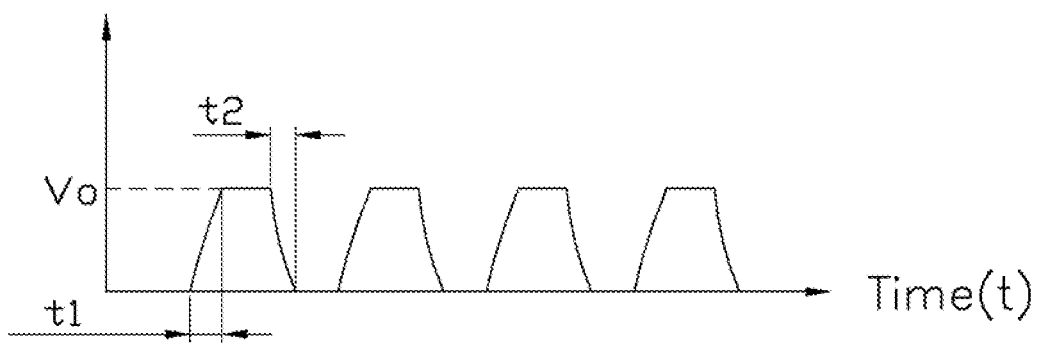

In the step (S11), the pulse signal can be inputted into the electrode pairs 100 at the same time or one by one. When a pulse signal is inputted into an electrode pair 100, other electrode pairs 100 can be connected to $V_{ss}$, $V_{dd}$, or floating. The pulse signal can be controlled by the first switch 124 and the second switch 136. In detail, the first switch 124 opens when the second switch 136 closes. The first switch 124 closes when the second switch 136 opens. Thus, the pulse signal is formed. Referring to FIG. 5, V represents a voltage value inputted into the transparent conductive film 104. Vc represents a voltage value of the coupled capacitance 114. A period of closing the first switch 124 is $T_1$. A period of closing the second switch 136 is $T_2$. In detail, the first switch 124 closes and the second switch 136 opens during $T_1$. The second switch 136 closes and the first switch 124 opens during $T_2$. In one embodiment, the period $T_1$ is greater than the period $T_2$.

When the first switch 124 closes at the period $T_1$, the charge circuit 122 inputs a voltage value $V_0$ into the transparent conductive film 104 by one of the electrode pairs 100 to charge the coupled capacitance 114. When the second switch 136 closes at the period $T_2$, the coupled capacitance 114 discharges, and the voltage value of the storage circuit 1320 is increased. During a period $t_1$ in the period $T_1$, the voltage value Vc of the coupled capacitance 114 is gradually increased to the voltage value $V_0$. After the period $t_1$, the voltage value Vc of the coupled capacitance 114 is equal to the voltage value $V_0$. During a period $t_2$ in the period $T_2$, the voltage value $V_c$ of the coupled capacitance 114 is gradually decreased, and the voltage value of the storage circuit 1320 is increased.

In the step (S12), the voltage values $V_{output}$ are related to the resistance value $R_n$ (n is 1, 2, 3, ..., n) and the capacitance value C. A relationship between $V_{output}$, $V_0$, and $R_nC$ satisfies a formula $$V_{output} = V_0 \times \left(1 - e^{-\frac{t}{R_nC}}\right),$$

here, t is a period of voltage value of the storage circuit 1320 rising from about zero to about a certain voltage value at a specific time point of the period $t_2$.

The resistance value of $R_n$ is lower than resistance values of $R_{1n}$ and $R_{2n}$ according to the formula $$\frac{1}{R_{1n}} + \frac{1}{R_{2n}} = \frac{1}{R_n},$$

therefore, a large voltage value $V_{output}$ can be obtained according to the formula $$V_{output} = V_0 \times \left(1 - e^{-\frac{t}{R_nC}}\right).$$

The large voltage value $V_{output}$ can be accurately read by the sensing circuit 130 to obtain an accurately resistance-capacitance values $R_nC$. Thus, the first coordinate X of the touch spot T along the first impedance direction H can be accurately obtained.

Figure 6:
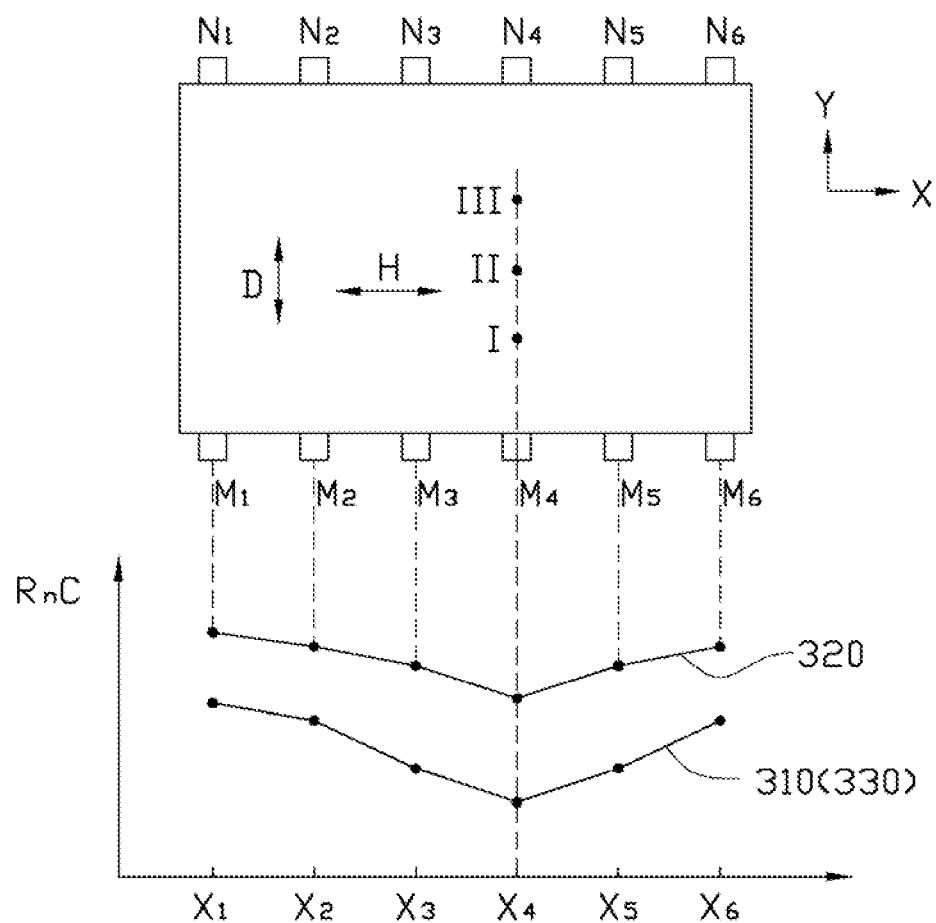
FIG. 6 is a waveform chart of electrical signal curves of separately scanning touch spots I-III of the touch panel shown in FIG. 1.

Referring to FIG. 6, one embodiment of scanning the electrode pairs 100 along the first impedance direction H to obtain an electrical signal curve 310 for determining a first coordinate X of the single touch spot I is described below.

The first driving electrodes 106 are labeled as $M_1$, $M_2$, $M_3$, $M_4$, $M_5$, and $M_6$. The second driving electrodes 108 are labeled as $N_1$, $N_2$, $N_3$, $N_4$, $N_5$, and $N_6$. Therefore, the electrode pairs 100 are labeled as $M_1$-$N_1$, $M_2$-$N_2$, $M_3$-$N_3$, $M_4$-$N_4$, $M_5$-$N_5$, and $M_6$-$N_6$. There are a number of coordinates $X_1$, $X_2$, $X_3$, $X_4$, $X_5$, and $X_6$ representing six coordinates X of the first driving electrodes 106, six coordinates X of the second driving electrodes 108, or six coordinates X of the electrode pairs 100 along the first impedance direction H. Thus, the sensing circuit 130 can obtain six resistance-capacitance values $R_1C$, $R_2C$, $R_3C$, $R_4C$, $R_5C$, and $R_6C$ from the electrode pairs 100 respectively. In detail, the resistance-capacitance value $R_1C$ is obtained by $M_1$-$N_1$, the resistance-capacitance value $R_2C$ is obtained by $M_2$-$N_2$, the resistance-capacitance value $R_3C$ is obtained by $M_3$-$N_3$, the resistance-capacitance value $R_4C$ is obtained by $M_4$-$N_4$, the resistance-capacitance value $R_5C$ is obtained by $M_5$-$N_5$, and the resistance-capacitance value $R_6C$ is obtained by $M_6$-$N_6$.

As shown in FIG. 6, the electrical signal curve 310 is a resistance-capacitance signal curve 310 formed by the resistance-capacitance values $R_1C$, $R_2C$, $R_3C$, $R_4C$, $R_5C$, and $R_6C$ when the conductive subject is near or touches the touch panel 10 at the single touch spot I. The resistance-capacitance value $R_4C$ obtained by the electrode pair $M_4$-$N_4$ is at the wave trough of the resistance-capacitance signal curve 310 and has the smallest resistance-capacitance value. In detail, the resistance-capacitance value $R_3C$ obtained by the electrode pair $M_3$-$N_3$ is equal to the resistance-capacitance value $R_5C$ obtained by the electrode pair $M_5$-$N_5$, and both of the resistance-capacitance values $R_3C$ and $R_5C$ are higher than the resistance-capacitance value $R_4C$. The resistance-capacitance values $R_nC$ obtained by electrode pairs 100 away from the electrode pair $M_4$-$N_4$ are larger than resistance-capacitance value $R_4C$ obtained by electrode pairs 100 adjacent to the electrode pair $M_4$-$N_4$. Furthermore, the resistance-capacitance signal curve 310 is symmetrical by a line of the electrode pair $M_4$-$N_4$. Because the touch spot I is just at the line of the electrode pair $M_4$-$N_4$, the $R_4$ and the resistance-capacitance value $R_4C$ can have the lowest resistance-capacitance value. Moreover, the $R_2$, $R_3$, $R_4$, $R_5$, and $R_6$ satisfy an inequation $R_2=R_6>R_3=R_5>R_4$, and the $R_2C$, $R_3C$, $R_5C$, $R_4C$, and $R_6C$ satisfy an inequation $R_2C=R_6C>R_3C=R_5C>R_4C$. Thus, the first coordinate X of the single touch spot I can be obtained by the resistance-capacitance signal curve 310 directly. The first coordinate X of the single touch spot I is the coordinate $X_4$.

Furthermore, the first coordinate X of the single touch spot I can also be obtained by an interpolation method. In detail, the first coordinate X of the single touch spot I can be determined by a formula $$\frac{X_3 \Delta R_3 C + X_5 \Delta R_5 C}{\Delta R_3 C + \Delta R_5 C},$$

a formula $$\frac{X_3 \Delta R_3 C + X_4 \Delta R_4 C + X_5 \Delta R_5 C}{\Delta R_3 C + \Delta R_4 C + \Delta R_5 C},$$

or a formula $$\frac{X_1 \Delta R_1 C + X_2 \Delta R_2 C + X_3 \Delta R_3 C + X_4 \Delta R_4 C + X_5 \Delta R_5 C + X_6 \Delta R_6 C}{\Delta R_1 C + \Delta R_2 C + \Delta R_3 C + \Delta R_4 C + \Delta R_5 C + \Delta R_6 C}.$$

In these formulas, $\Delta R_n C$ satisfies a formula $R_k C - R_n C$ (n is 1, 2, 3, ..., 6), wherein $R_k C$ is the greatest resistance-capacitance value of the resistance-capacitance signal curve 310. As shown in FIG. 6, the greatest resistance-capacitance value of the resistance-capacitance signal curve 310 is the resistance-capacitance value $R_1 C$. In one embodiment, the first coordinate X of the single touch spot I is determined by the formula $$\frac{X_3 \Delta R_3 C + X_5 \Delta R_5 C}{\Delta R_3 C + \Delta R_5 C}.$$

Referring to FIG. 6, one embodiment of scanning the electrode pairs 100 along the first impedance direction H to obtain an electrical signal curve 320 for determining a first coordinate X of the single touch spot II is described below.

As shown in FIG. 6, the electrical signal curve 320 is a resistance-capacitance signal curve 320 formed by the resistance-capacitance values $R_1 C$, $R_2 C$, $R_3 C$, $R_4 C$, $R_5 C$, and $R_6 C$ when the conductive subject is near or touches the touch panel 10 at the single touch spot II. A variation tendency of the resistance-capacitance signal curve 320 is similar to that of the resistance-capacitance signal curve 310. However, the resistance-capacitance values $R_n C$ of the resistance-capacitance signal curve 320 are larger than the resistance-capacitance values $R_n C$ of the resistance-capacitance signal curve 310 respectively. This is because the $R_n$ of touch spot II is larger than the $R_n$ of touch spot I respectively. Thus, the first coordinate X of the single touch spot II can be obtained by the resistance-capacitance signal curve 310 directly. The first coordinate X of the single touch spot II is the coordinate $X_4$. In addition, it can be known form the resistance-capacitance signal curve 310 and 320 that the touch spot II is adjacent to a middle of the transparent conductive film 104 along the second impedance direction D, and the touch spot I is away from the middle of the transparent conductive film 104 along the second impedance direction D. It should be understood that, the first coordinate X of the single touch spot II can also be computed by the interpolation method.

Referring to FIG. 6, one embodiment of scanning the electrode pairs 100 along the first impedance direction H to obtain an electrical signal curve 330 for determining a first coordinate X of the single touch spot III is described below.

As shown in FIG. 6, the electrical signal curve 330 is a resistance-capacitance signal curve 330 formed by the resistance-capacitance values $R_1 C$, $R_2 C$, $R_3 C$, $R_4 C$, $R_5 C$, and $R_6 C$ when the conductive subject is near or touches the touch panel 10 at the single touch spot III. The resistance-capacitance signal curve 330 and coincide with resistance-capacitance signal curve 310. This is because the $R_n$ of touch spot II is equal to the $R_n$ of touch spot III respectively. Thus, the first coordinate X of the single touch spot III can also be obtained from the resistance-capacitance signal curve 330 directly. The first coordinate X of the single touch spot III is the coordinate $X_4$. In addition, it can be known form the resistance-capacitance signal curves 310 and 330 that the touch spot I and the touch spot III is symmetrical by the middle of the transparent conductive film 104 along the second impedance direction D. The first coordinate X of the single touch spot III can also be obtained by the interpolation method.

Figure 7:
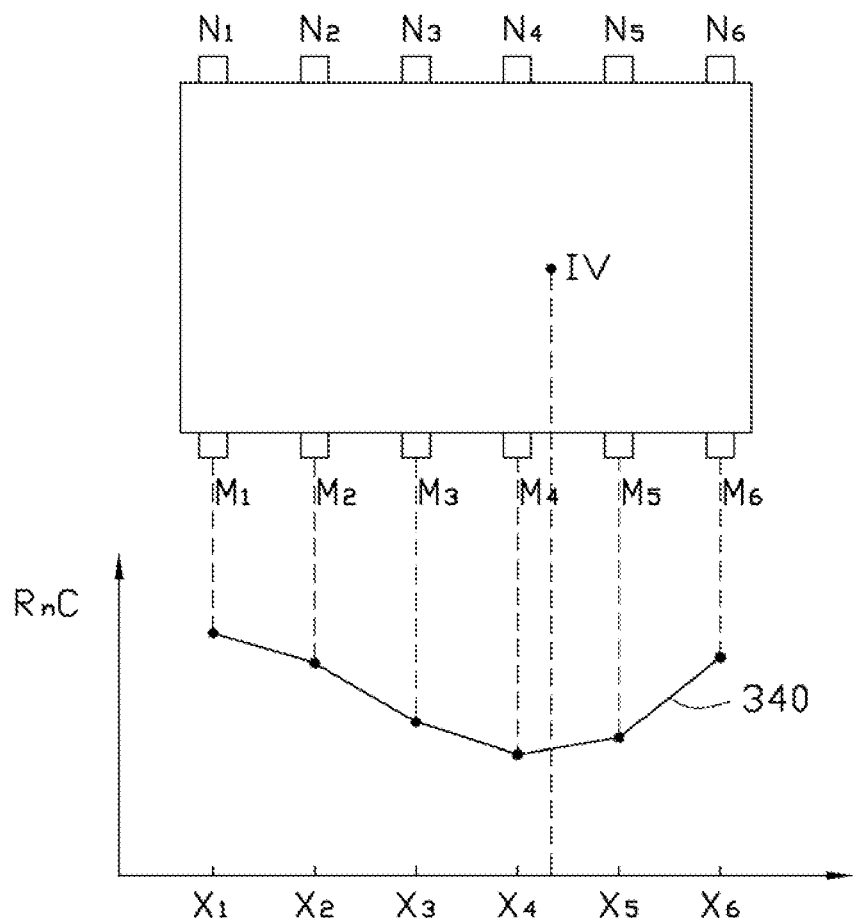
FIG. 7 is a waveform chart of an electrical signal curve of scanning a touch spot IV of the touch panel shown in FIG. 1.

Referring to FIG. 7, one embodiment of scanning the electrode pairs 100 along the first impedance direction H to obtain an electrical signal curve 340 for determining a first coordinate X of the single touch spot IV is described below.

As shown in FIG. 7, the electrical signal curve 340 is a resistance-capacitance signal curve 340 formed by the resistance-capacitance values $R_1 C$, $R_2 C$, $R_3 C$, $R_4 C$, $R_5 C$, and $R_6 C$ when the conductive subject is near or touches the touch panel 10 at the single touch spot IV. The resistance-capacitance value $R_4 C$ detected by the electrode pair $M_4$-$N_4$ is at the trough of the resistance-capacitance signal curve 340 and has the smallest resistance-capacitance value. The resistance-capacitance values $R_3 C$, $R_4 C$, and $R_5 C$ satisfy an inequation $R_3 C > R_5 C > R_4 C$. In addition, The resistance-capacitance values $R_n C$ detected by electrode pairs 100 far away from the electrode pair $M_4$-$N_4$ are larger than the resistance-capacitance value $R_4 C$ detected by electrode pairs 100 adjacent to the electrode pair $M_4$-$N_4$. Therefore, it can be known from the resistance-capacitance signal curve 340 that the touch spot IV is located between the electrode pairs $M_4$-$N_4$ and $M_5$-$N_5$, and is adjacent to the electrode pair $M_4$-$N_4$. Thus, the first coordinate X of the single touch spot IV is the coordinate closer to $X_4$.

Furthermore, the accurate first coordinate X of the single touch spot IV can be obtained by the interpolation method. In detail, the first coordinate X of the single touch spot IV can be determined by a formula $$\frac{X_4 \Delta R_4 C + X_5 \Delta R_5 C}{\Delta R_4 C + \Delta R_5 C},$$

a formula $$\frac{X_3 \Delta R_3 C + X_4 \Delta R_4 C + X_5 \Delta R_5 C}{\Delta R_3 C + \Delta R_4 C + \Delta R_5 C},$$

or a formula $$\frac{X_1 \Delta R_1 C + X_2 \Delta R_2 C + X_3 \Delta R_3 C + X_4 \Delta R_4 C + X_5 \Delta R_5 C + X_6 \Delta R_6 C}{\Delta R_1 C + \Delta R_2 C + \Delta R_3 C + \Delta R_4 C + \Delta R_5 C + \Delta R_6 C}.$$

In the formulas, $\Delta R_n C$ satisfies a formula $R_k C - R_n C$ (n is 1, 2, 3, ..., 6), wherein $R_k C$ is the greatest resistance-capacitance value of the resistance-capacitance signal curve 340. As shown in FIG. 7, the greatest resistance-capacitance value of the resistance-capacitance signal curve 340 is the resistance-capacitance value $R_1 C$. In one embodiment, the first coordinate of the single touch spot IV is obtained by the formula $$\frac{X_3 \Delta R_3 C + X_4 \Delta R_4 C + X_5 \Delta R_5 C}{\Delta R_3 C + \Delta R_4 C + \Delta R_5 C}.$$

Figure 8:
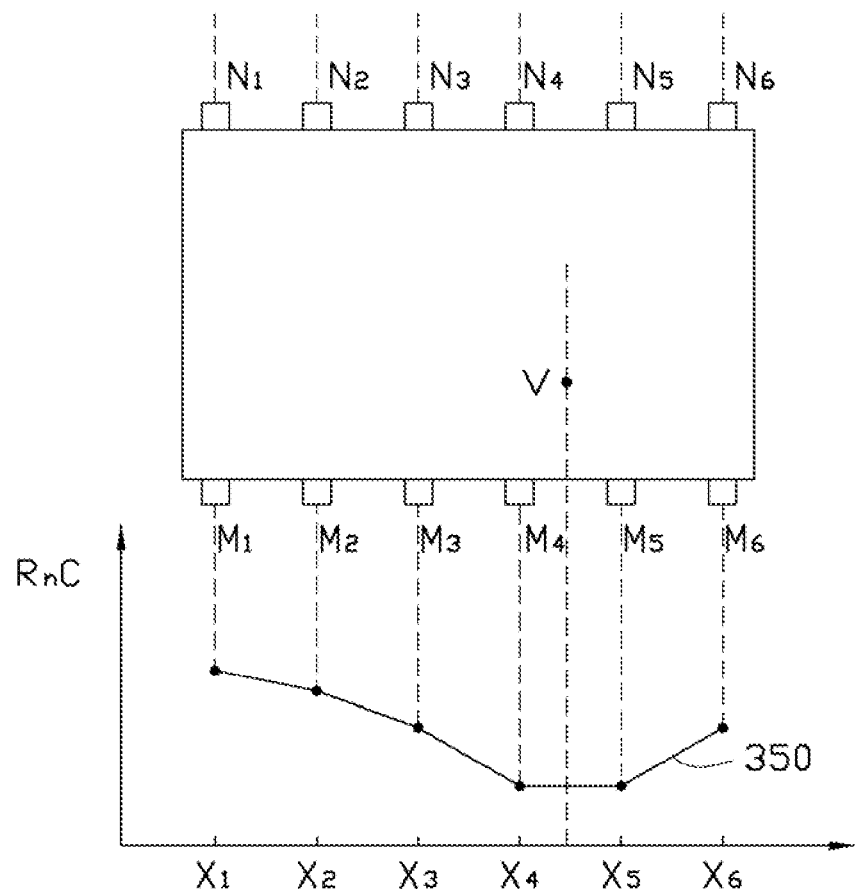
FIG. 8 is a waveform chart of an electrical signal curve of scanning a touch spot V of the touch panel shown in FIG. 1.

Referring to FIG. 8, one embodiment of scanning the electrode pairs 100 along the first impedance direction H to obtain an electrical signal curve 350 for determining a first coordinate X of the single touch spot V is described below.

As shown in FIG. 8, the electrical signal curve 350 is a resistance-capacitance signal curve 350 formed by the resistance-capacitance values $R_1 C$, $R_2 C$, $R_3 C$, $R_4 C$, $R_5 C$, and $R_6 C$ when the conductive subject is near or touches the touch panel 10 at the single touch spot V. The resistance-capacitance value $R_4C$ detected by the electrode pair $M_4$-$N_4$ is substantially equal to the resistance-capacitance value $R_5C$ detected by the electrode pair $M_5$-$N_5$. In addition, the resistance-capacitance values $R_3C$, $R_4C$, $R_5C$, and $R_6C$ satisfy the inequation $R_3C=R_6C>R_4C=R_5C$. Thus, the first coordinate X of the single touch spot V can be obtained by the resistance-capacitance signal curve 350 directly. The first coordinate X of the single touch spot V is a coordinate located in the middle of $X_4$ and $X_5$. The first coordinate X of the single touch spot V is the coordinate $$\frac{X_4 + X_5}{2}.$$

Furthermore, the first coordinate X of the single touch spot V can also be obtained by an interpolation method. In detail, the first coordinate of the single touch spot V can be determined by a formula $$\frac{X_4\Delta R_4C + X_5\Delta R_5C}{\Delta R_4C + \Delta R_5C},$$

a formula $$\frac{X_3\Delta R_3C + X_4\Delta R_4C + X_5\Delta R_5C}{\Delta R_3C + \Delta R_4C + \Delta R_5C},$$

a formula $$\frac{X_4\Delta R_4C + X_5\Delta R_5C + X_6\Delta R_6C}{\Delta R_4C + \Delta R_5C + \Delta R_6C},$$

or a formula $$\frac{X_1\Delta R_1C + X_2\Delta R_2C + X_3\Delta R_3C + X_4\Delta R_4C + X_5\Delta R_5C + X_6\Delta R_6C}{\Delta R_1C + \Delta R_2C + \Delta R_3C + \Delta R_4C + \Delta R_5C + \Delta R_6C}.$$

In the formulas, $\Delta R_nC$ satisfies a formula $R_kC - R_nC$ (n is 1, 2, 3, ..., 6), wherein $R_kC$ is the greatest resistance-capacitance value of the resistance-capacitance signal curve 340. As shown in FIG. 8, the greatest resistance-capacitance value of the resistance-capacitance signal curve 350 is the resistance-capacitance value $R_1C$.

Accordingly, if the first coordinate X of the single touch spot cannot be obtained by the resistance-capacitance signal curve directly, the first coordinate X of the single touch spot can be obtained by the interpolation method.

Figure 9:
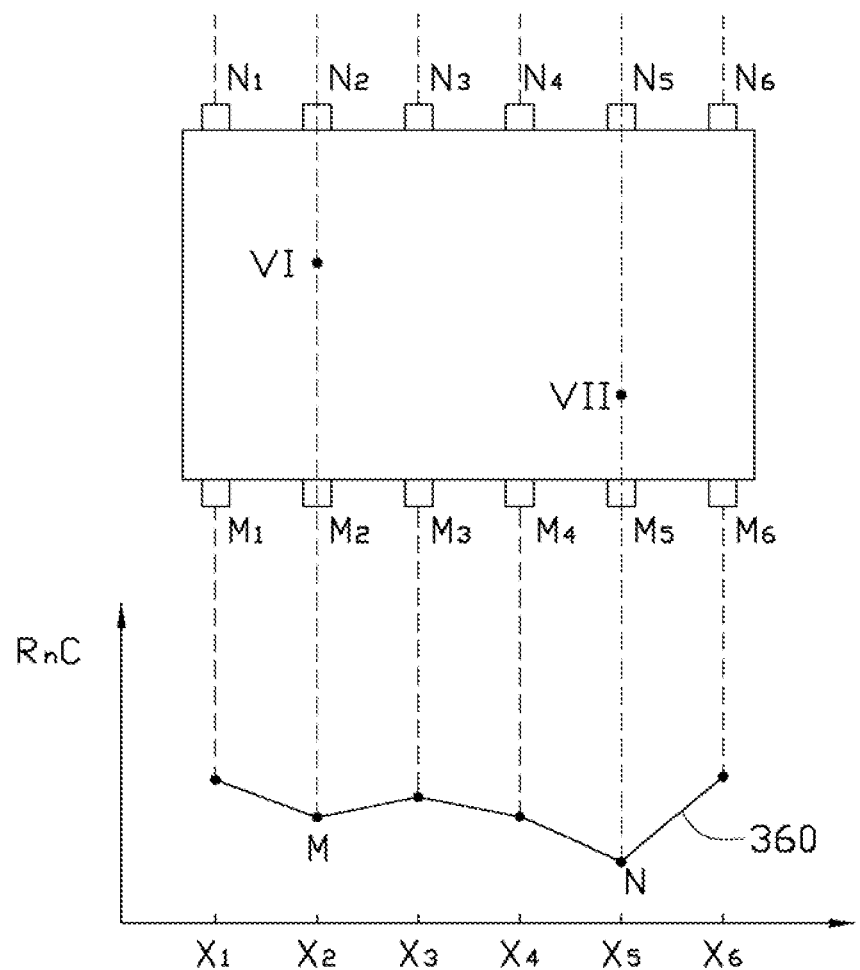
FIG. 9 is a waveform chart of electrical signal curves of simultaneously scanning touch spots VI and VII of the touch panel shown in FIG. 1.

Referring to FIG. 9, one embodiment of scanning the electrode pairs 100 along the first impedance direction H to obtain an electrical signal curve 360 for determining first coordinates X of single touch spots VI and VII is described below.

As shown in FIG. 9, the electrical signal curve 360 is a resistance-capacitance signal curve 360 formed by the resistance-capacitance values $R_1C$, $R_2C$, $R_3C$, $R_4C$, $R_5C$, and $R_6C$ when the conductive subjects are near or touch the touch panel 10 at the touch spots VI and VII. The resistance-capacitance values $R_2C$ and $R_5C$ are two wave troughs of the resistance-capacitance signal curve 360. The resistance-capacitance values $R_1C$ and $R_3C$ adjacent to the resistance-capacitance value $R_2C$ are greater than the resistance-capacitance value $R_2C$. The resistance-capacitance values $R_4C$ and $R_6C$ adjacent to the resistance-capacitance value $R_5C$ are greater than the resistance-capacitance value $R_5C$.

Furthermore, the first coordinate X of the touch spot VI can be determined according to the electrical signal curve 360 by an interpolation method. In detail, the first coordinate X of the touch spot VI can be determined by a formula $$\frac{X_1\Delta R_1C + X_2\Delta R_2C + X_3\Delta R_3C}{\Delta R_1C + \Delta R_2C + \Delta R_3C}.$$

The first coordinate X of the touch spot VII can be determined according to the electrical signal curve 360 by an interpolation method. In detail, the first coordinate X of the touch spot VII can be determined by a formula $$\frac{X_4\Delta R_4C + X_5\Delta R_5C + X_6\Delta R_6C}{\Delta R_4C + \Delta R_5C + \Delta R_6C}.$$

Accordingly, one embodiment of a method for determining first coordinates of touch spots along the first impedance direction H according to an electrical signal curve includes:

(a), imitating a resistance-capacitance signal curve according to the resistance-capacitance values $R_nC$ (n is 1, 2, 3, ..., n);

(b), detecting a number of resistance-capacitance values $R_mC$ (m is 1, 2, 3, ..., m) according to the wave troughs of the resistance-capacitance signal curve respectively, and detecting two resistance-capacitance values $R_{m-1}C$ and $R_{m+1}C$ adjacent to each of the resistance-capacitance values $R_mC$; and (c), obtaining the first coordinates X of the touch spots by the interpolation method.

Because of the anisotropic impedance characteristic of the transparent conductive film 104, the $R_n$ between the touch spots and the electrode pair adjacent to the touch spots is much lower than the $R_n$ between the touch spots and electrode pairs away from the touch spots. Therefore, the resistance-capacitance value $R_nC$ between the touch spot and the electrode pairs adjacent to the touch spots is much lower than the resistance-capacitance values $R_nC$ between the touch spot and the electrode pairs away from the touch spots, thus, the first coordinates X of the touch spots can be accurately obtained without interfere from adjacent electrode pairs.

After the first coordinates X of the touch spots are obtained by the step (S1), the step (S2) can be further progressed according to the first coordinates X of the touch spots. First, a number of the electrode pairs 100 near the first coordinates X are selected. The selected electrode pairs 100 are adjacent to the first coordinates X of the touch spots. The number of the selected electrode pairs 100 is not limited. Second, the electrical signals of the selected electrode pairs 100 obtained by the step (S1) are transformed into electric quantity values $Q_{pn}$. The electrical signals of the selected electrode pairs 100 are the voltage values $V_{output}$ of the storage circuit 1320, so the voltage values $V_{output}$ can be transformed into the electric quantity values $Q_{pn}$ by a formula $Q_{pn}=C_{1320}\times V_{output}$, here, the $C_{1320}$ is the capacitance of the storage circuit 1320. Third, the electrode pair signal $P_{sum}$ according to the electric quantity values $Q_{pn}$ is obtained.

In one embodiment, three electrode pairs 100 adjacent to the first coordinates X of the touch spots are selected. The electrical signals of the three selected electrode pairs 100 can be defined as voltage values $V_{n-1}$, $V_n$, and $V_{n+1}$. Thus, the voltage values $V_{n-1}$, $V_n$, and $V_{n+1}$ can be transformed into the electric quantity values $Q_{Pn-1}$, $Q_{Pn}$, and $Q_{Pn+1}$ respectively by the formula $Q_{pn}=C_{1320} \times V_{output}$, finally, the electrode pair signal $P_{sum}$ can be calculated by a formula $P_{sum}=Q_{pn-1}Q_{pn}+Q_{pn+1}$.

In the step (S3), a method of scanning the first driving electrodes 106 of the selected electrode pairs 100 to obtain a first signal $M_{sum}$ includes:

(S31), inputting a pulse signal into the first driving electrodes 106 of the selected electrode pairs 100 simultaneously or respectively by the driving circuit 120; and (S32), determining a number of first signals from the first driving electrodes 106 of the selected electrode pairs 100 by the sensing circuit 130 to obtain a first signal $M_{sum}$.

Figure 10:
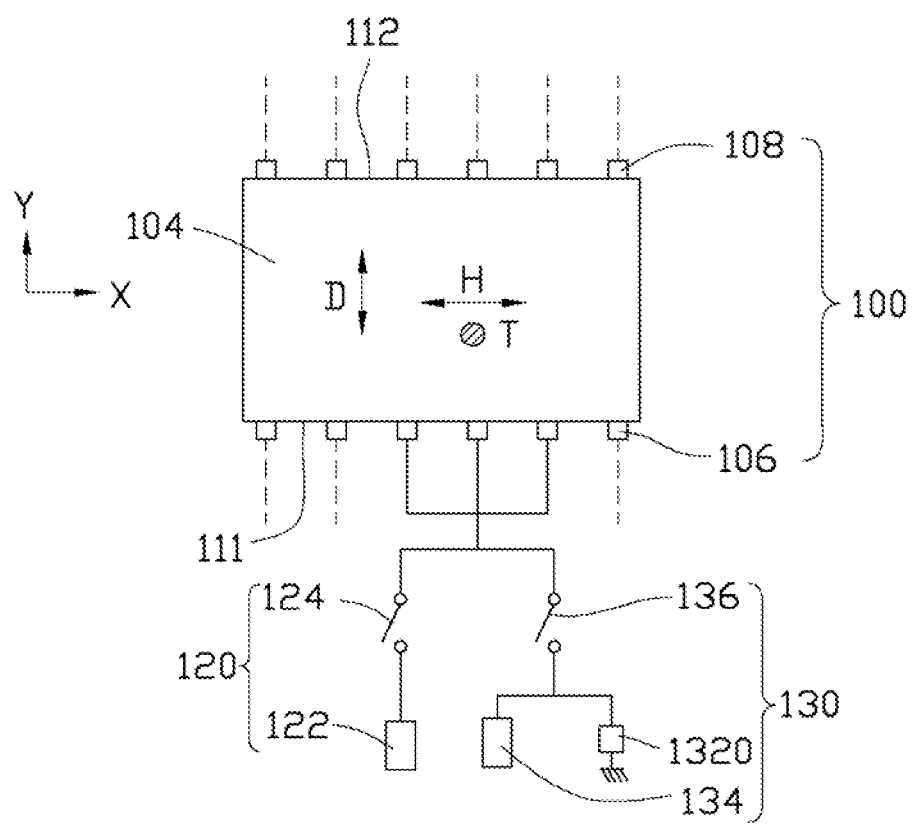
FIG. 10 is a schematic view of one embodiment of scanning a number of first driving electrodes of the touch panel shown in FIG. 1.
Figure 11:
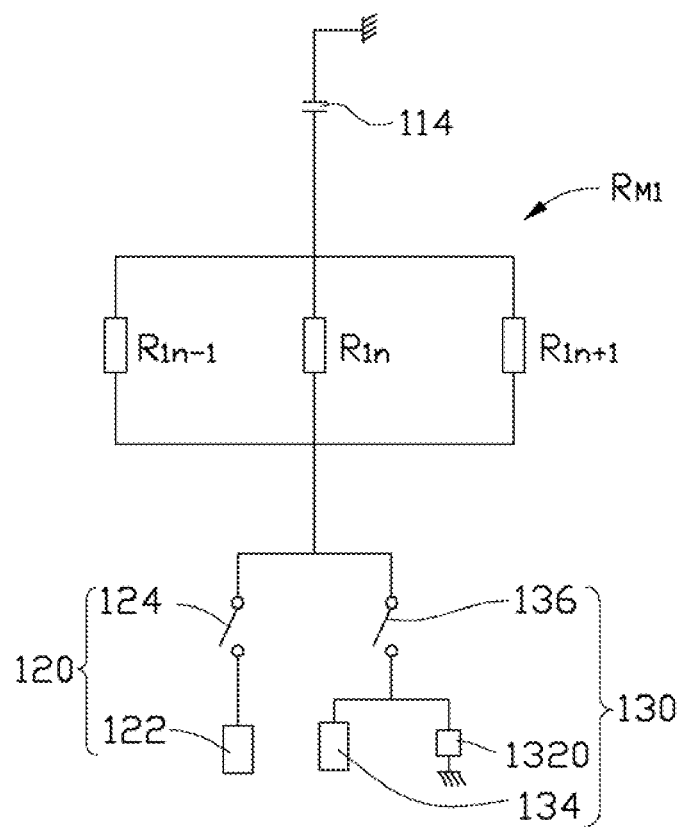
FIG. 11 is a circuit diagram of scanning the first driving electrodes of the touch panel shown in FIG. 10.

In one embodiment, referring to FIG. 10, in the step (S31), the first driving electrodes 106 of the selected electrode pairs 100 are electrically connected with each other, and then both electrically connected to a driving circuit 120 and a sensing circuit 130. Thus, referring to FIG. 11, the touch spot T of the touch panel 10 and the first driving electrodes 106 of the selected electrode pairs 100 can form a resistance value $R_{M1}$. A relationship between $R_{M1}$, $R_{1n}$, $R_{1n+1}$, and $R_{1n-1}$ satisfies a formula $$\frac{1}{R_{1n-1}} + \frac{1}{R_{1n}} + \frac{1}{R_{1n+1}} = \frac{1}{R_{M1}}.$$

A pulse signal $V_0$ is input into first driving electrodes 106 of the selected electrode pairs 100 by the driving circuit 120 at the same time. In the step (S32), the sensing circuit 130 can obtain a first voltage signal $V_{M1}$. Thus, the first voltage signal $V_{M1}$ can be transformed into an electric quantity values $Q_{M1}$ by a formula $Q_{M1}=C_{1320} \times V_{M1}$, therefore, the first signal $M_{sum}$ can be obtained by a formula $M_{sum}=Q_{M1}$.

Figure 12:
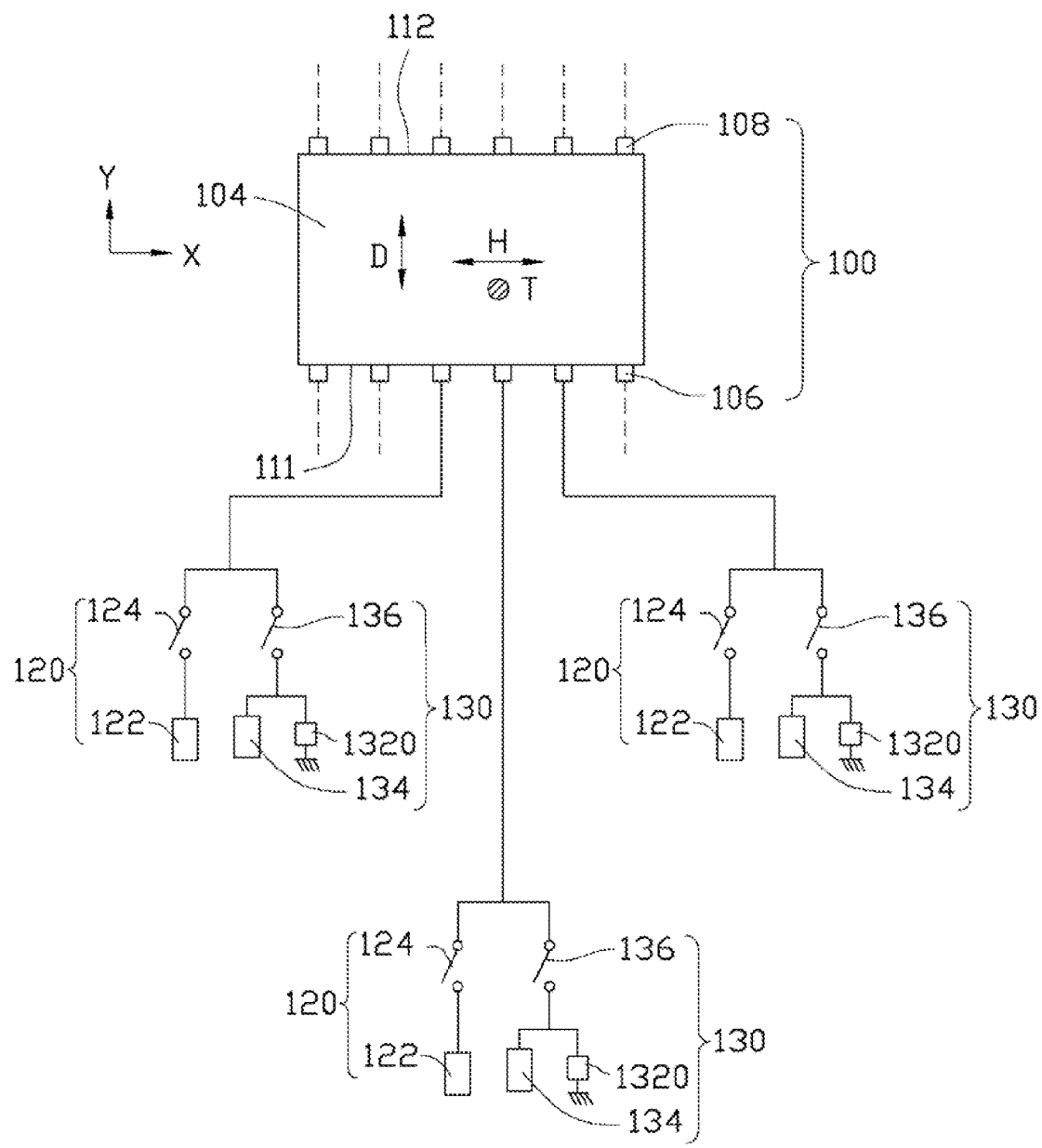
FIG. 12 is a schematic view of another embodiment of scanning a number of first driving electrodes of the touch panel shown in FIG. 1.
Figure 13:
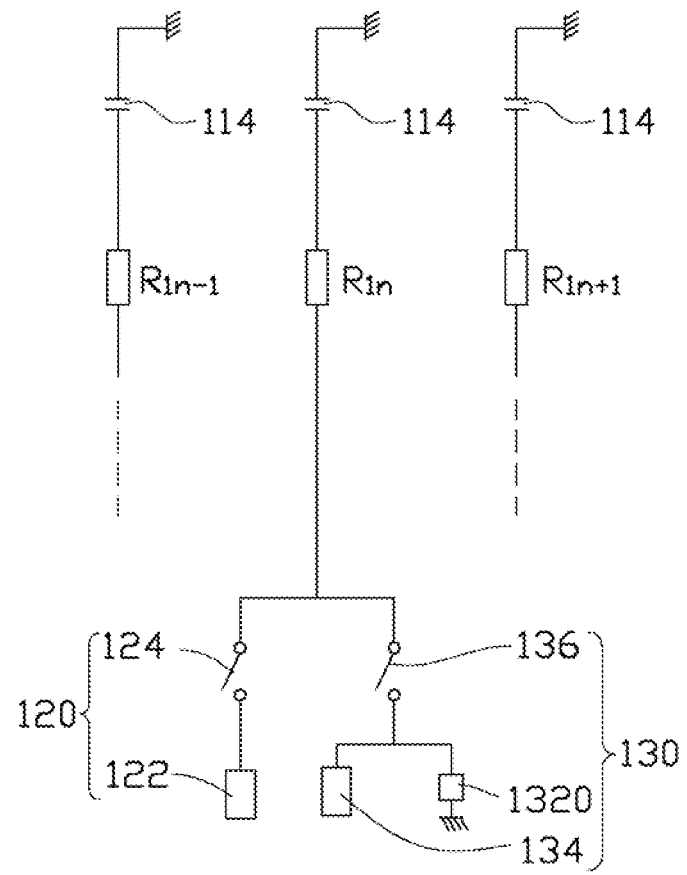
FIG. 13 is a circuit diagram of scanning the first driving electrodes of the touch panel shown in FIG. 12.

In another embodiment, referring to FIG. 12, in the step (S31), each first driving electrode 106 of the selected electrode pair 100 is electrically connected to a driving circuit 120 and a sensing circuit 130. Thus, referring to FIG. 13, the touch spot T of the touch panel 10 and each first driving electrode 106 of the selected electrode pair 100 can form a number of resistance values $R_{1n}$, $R_{1n+1}$, and $R_{1n-1}$ respectively. A pulse signal $V_0$ is input into each first driving electrode 106 of the selected electrode pair 100 by the driving circuit 120 one by one. In the step (S32), the sensing circuit 130 respectively can obtain a number of first voltage signals $V_{M2}$, $V_{M3}$, and $V_{M4}$. Thus, the first voltage signals $V_{M2}$, $V_{M3}$, and $V_{M4}$ can be transformed into electric quantity values $Q_{M2}$, $Q_{M3}$, and $Q_{M4}$ respectively by the formula $Q_{M1}=C_{1320} \times V_{M1}$. The first signal $M_{sum}$ can be obtained by a formula $M_{sum}=Q_{M2}+Q_{M3}+Q_{M4}$.

Figure 14:
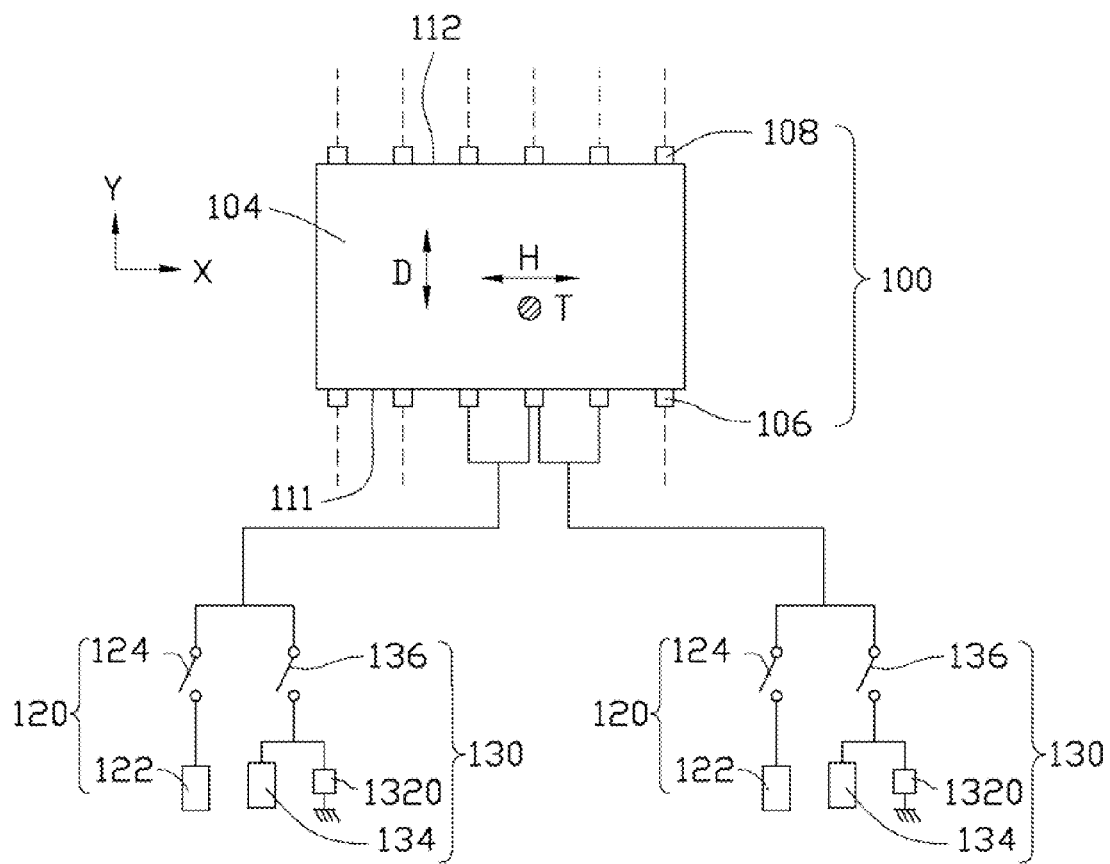
FIG. 14 is a schematic view of another embodiment of scanning a number of first driving electrodes of the touch panel shown in FIG. 1.
Figure 15:
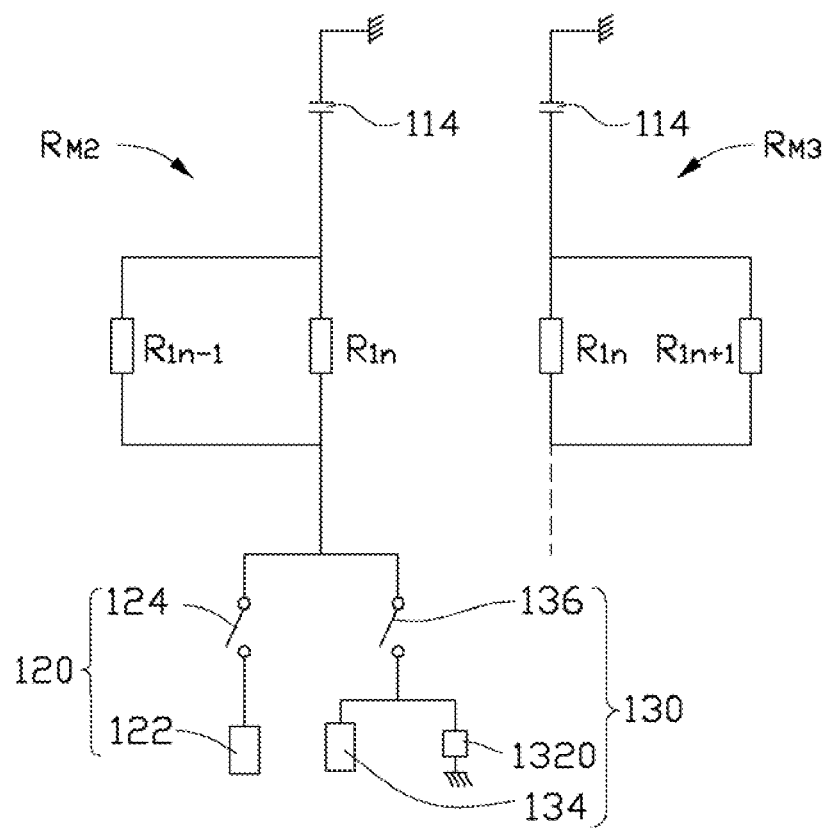
FIG. 15 is a circuit diagram of scanning the first driving electrodes of the touch panel shown in FIG. 14.

In other embodiment, referring to FIG. 14, in the step (S31), adjacent two first driving electrodes 106 of the selected electrode pairs 100 are electrically connected to a driving circuit 120 and a sensing circuit 130 respectively. Thus, referring to FIG. 15, the touch spot T of the touch panel 10 and the adjacent two first driving electrodes 106 of the selected electrode pairs 100 can form a number of resistance values $R_{M2}$, and $R_{M3}$ respectively. A relationship between $R_{M2}$, $R_{1n}$, and $R_{1n-1}$ satisfies a formula $$\frac{1}{R_{1n-1}} + \frac{1}{R_{1n}} = \frac{1}{R_{M2}};$$

a relationship between $R_{M3}$, $R_{1n}$, and $R_{1n+1}$ satisfies a formula $$\frac{1}{R_{1n+1}} + \frac{1}{R_{1n}} = \frac{1}{R_{M3}}.$$

A pulse signal $V_0$ is input into the adjacent two first driving electrodes 106 of the selected electrode pairs 100 by the driving circuit 120 one by one. In the step (S32), the sensing circuit 130 respectively can obtain a number of first voltage signals $V_{M5}$ and $V_{M6}$. Thus, the first signals $V_{M5}$, and $V_{M6}$ can be transformed into electric quantity values $Q_{M5}$, and $Q_{M6}$ respectively by the formula $Q_{M1}=C_{1320} \times V_{M1}$. The first signal $M_{sum}$ can be obtained by a formula $M_{sum}=Q_{M5}+Q_{M6}$.

In the step (S4), a method of scanning the second driving electrodes 108 of the selected electrode pairs 100 to obtain a second signal $N_{sum}$ includes:

(S41), inputting a pulse signal into the second driving electrodes 108 of the selected electrode pairs 100 simultaneously or respectively by the driving circuit 120; and (S42), determining a number of second signals from the second driving electrodes 108 of the selected electrode pairs 100 by the sensing circuit 130 to obtain a second signal $N_{sum}$.

Figure 16:
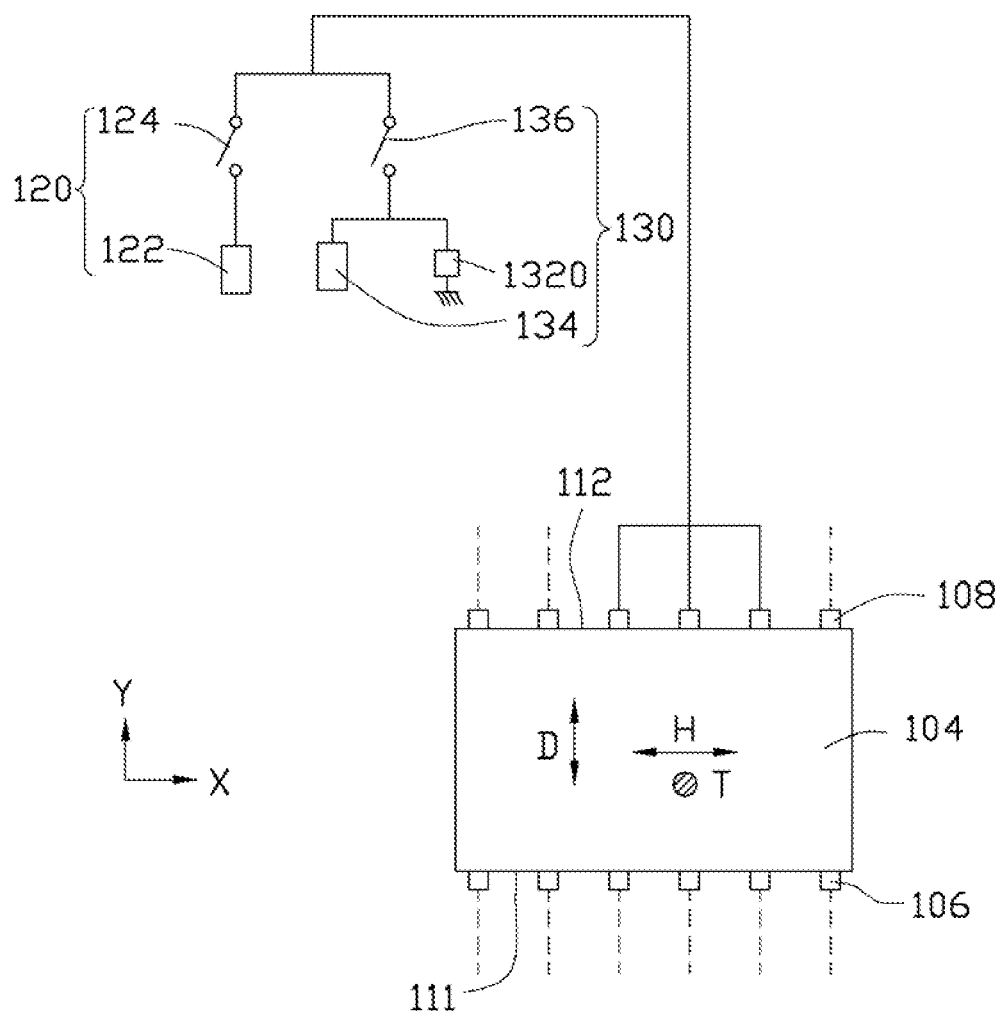
FIG. 16 is a schematic view of one embodiment of scanning a number of second driving electrodes of the touch panel shown in FIG. 1.
Figure 17:
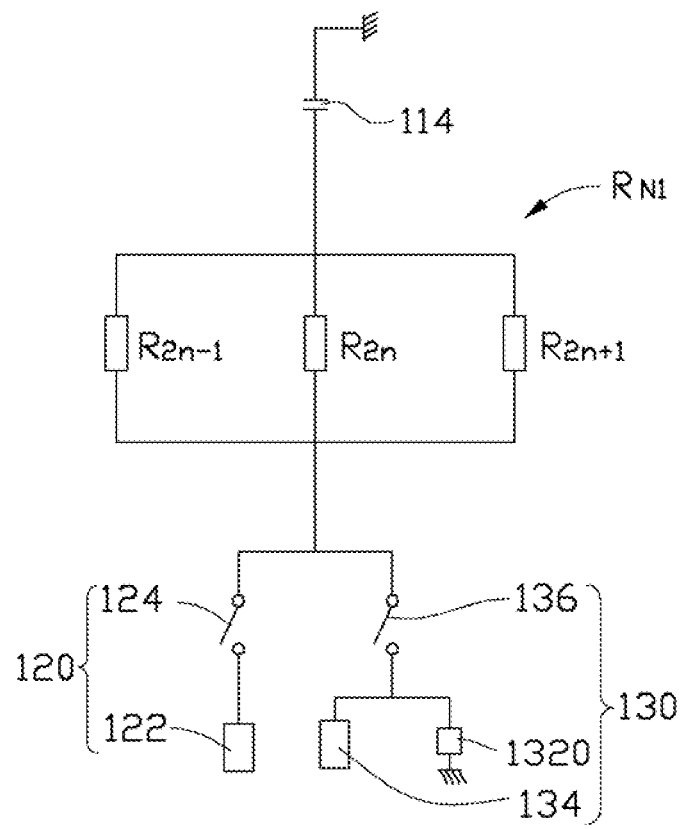
FIG. 17 is a circuit diagram of scanning the second driving electrodes of the touch panel shown in FIG. 16.

The step (S4) is almost the same as the step (S3). In one embodiment, referring to FIG. 16, in the step (S41), the second driving electrodes 108 of the selected electrode pairs 100 are electrically connected with each other, and then are electrically connected to a driving circuit 120 and a sensing circuit 130. Thus, referring to FIG. 17, the touch spot T of the touch panel 10 and the second driving electrodes 108 of the selected electrode pairs 100 can form a resistance value $R_{N1}$. A relationship between $R_{N1}$, $R_{2n}$, $R_{2n+1}$, and $R_{2n-1}$ satisfies a formula $$\frac{1}{R_{2n-1}} + \frac{1}{R_{2n}} + \frac{1}{R_{2n+1}} = \frac{1}{R_{N1}}.$$

A pulse signal $V_0$ is input into second driving electrodes 108 of the selected electrode pairs 100 by the driving circuit 120 at the same time. In the step (S42), the sensing circuit 130 can obtain a second voltage signal $V_{N1}$. Thus, the second voltage signal $V_{N1}$ can be transformed into an electric quantity values $Q_{N1}$ by a formula $Q_{N1}=C_{1320} \times V_{N1}$, therefore, the second signal $N_{sum}$ can be obtained by a formula $N_{sum}=Q_{N1}$.

The method of scanning the second driving electrodes 108 of the selected electrode pairs 100 to obtain a second signal $N_{sum}$ can be selected from other scanning methods as the step (S3). However, the method of scanning the second driving electrodes 108 of the selected electrode pairs 100 should be the same as the method of scanning the first driving electrodes 106 of the selected electrode pairs 100 in the same embodiment.

Figure 18:
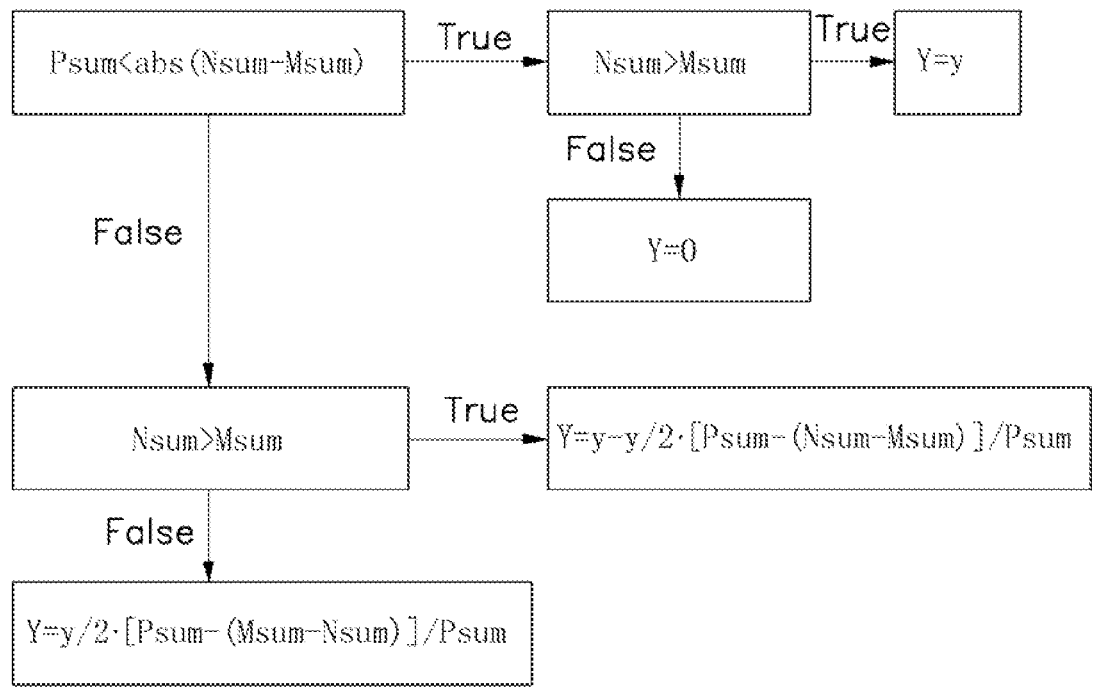
FIG. 18 is a flow chart of one embodiment of a method for detecting a second coordinate of a touch spot of a touch panel.

Referring to FIG. 18, in the step (S5), a method of determining a second coordinate Y of the touch spots T includes:

(S51), if $P_{sum} \leq abs(N_{sum}-M_{sum})$, determining a second coordinate Y by step (S52); if $P_{sum} > abs(N_{sum}-M_{sum})$, determining a second coordinate Y by step (S53), here, abs represents an absolute value;

(S52), if $N_{sum} \geq M_{sum}$ determining a second coordinate Y=y; if $N_{sum} < M_{sum}$, determining a second coordinate Y=0, here, y represents a distance from the first side 111 to the second side 112 along the second impedance direction D;

(S53), if $N_{sum} \geq M_{sum}$, determining a second coordinate Y by a formula $$Y = y - \frac{y}{2} \times \frac{P_{sum} - (N_{sum} - M_{sum})}{P_{sum}};$$

if $N_{sum} < M_{sum}$, determining a second coordinate Y by a formula $$Y = \frac{y}{2} \times \frac{P_{sum} - (M_{sum} - N_{sum})}{P_{sum}}.$$

More specifically, when the inequation $P_{sum} \leq abs(N_{sum} - M_{sum})$ is satisfied, it can be determined that the touch spot T is at the first side 111 or the second side 112 of the transparent conductive film 104. Furthermore, when the inequation $N_{sum} \geq M_{sum}$ is satisfied, it can be determined that the touch spot T is at the second side 112 of the transparent conductive film 104. In other words, the second coordinate Y=y; when the inequation $N_{sum} < M_{sum}$ is satisfied, it can be determined that the touch spot T is at the first side 111 of the transparent conductive film 104, in other words, the second coordinate Y=0.

When the inequation $P_{sum} > abs(N_{sum} - M_{sum})$ is satisfied, it can be determined that the touch spot T is not at the first side 111 or the second side 112 of the transparent conductive film 104. Furthermore, when the inequation $N_{sum} \geq M_{sum}$ is satisfied, the second coordinate Y can be further determined by the formula $$Y = y - \frac{y}{2} \times \frac{P_{sum} - (N_{sum} - M_{sum})}{P_{sum}};$$

when the inequation $N_{sum} < M_{sum}$ is satisfied, the second coordinate Y can be further determined by the formula $$Y = \frac{y}{2} \times \frac{P_{sum} - (M_{sum} - N_{sum})}{P_{sum}}.$$

Because the electrode pair signal $P_{sum}$, the first signal $M_{sum}$, and the second signal $N_{sum}$ are determined by the same formula $Q_{pn} = C_{1320} \times V_{output}$, the voltage values $V_{output}$ obtained by the steps (S2), (S3), and (S4) can be regarded as the electrode pair signal $P_{sum}$, the first signal $M_{sum}$, and the second signal $N_{sum}$ respectively without transforming into the electric quantity values. For example, in the step (S2), the electrode pair signal $P_{sum}$ can be obtained by the formula $P_{sum} = V_{n-1} + V_n + V_{n+1}$ directly. In the step (S3), the first signal $M_{sum}$ can be equal to the first signal $V_{M1}$, in other words, $M_{sum} = V_{M1}$. In the step (S4), the second signal $N_{sum}$ can be equal to the second signal $V_{N1}$, in other words, $N_{sum} = V_{N1}$.

Accordingly, the present disclosure is capable of providing a method for detecting a touch spot of a touch panel, which can reduce the time of scanning driving electrodes of each of electrode pairs and improve the precision of detecting the touch spots. Furthermore, touch spots at the first side 111 or the second side 112 of the transparent conductive film 104 can be precisely detected by the above method.

Finally, it is to be understood that the above-described embodiments are intended to illustrate rather than limit the present disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for detecting a touch spot of a touch panel, the touch panel comprising a conductive film and a plurality of electrode pairs, the conductive film defining a first impedance direction and a second impedance direction substantially perpendicular to the first impedance direction, the plurality of electrode pairs being arranged along the first impedance direction, each of the plurality of electrode pairs comprising a first driving electrode and a second driving electrode separately located on two opposite sides of the conductive film, the method comprising:

scanning the plurality of electrode pairs along the first impedance direction to obtain a plurality of electrical signals for determining a first coordinate of the touch spot;

selecting a plurality of electrode pairs near the first coordinate to obtain an electrode pair signal $P_{sum}$;

scanning first driving electrodes of the plurality of selected electrode pairs to obtain a first signal $M_{sum}$;

scanning second driving electrodes of the plurality of selected electrode pairs to obtain a second signal $N_{sum}$; and determining a second coordinate of the touch spot according to the electrode pair signal $P_{sum}$, the first signal $M_{sum}$, and the second signal $N_{sum}$ by the sub-steps of:

determining a second coordinate Y=y, when $P_{sum} \leq abs(N_{sum} - M_{sum})$ and $N_{sum} \geq M_{sum}$, determining a second coordinate Y=0, when $P_{sum} \leq abs(N_{sum} - M_{sum})$ and $N_{sum} < M_{sum}$, determining a second coordinate by a formula $$y - \frac{y}{2} \times \frac{P_{sum} - (N_{sum} - M_{sum})}{P_{sum}},$$

when $P_{sum} > abs(N_{sum} - M_{sum})$ and $N_{sum} \geq M_{sum}$; and determining a second coordinate by a formula $$\frac{y}{2} \times \frac{P_{sum} - (M_{sum} - N_{sum})}{P_{sum}},$$

when $P_{sum} > abs(N_{sum} - M_{sum})$ and $N_{sum} < M_{sum}$, wherein abs represents an absolute value, and y represents a distance between the two opposite sides along the second impedance direction.

2. The method as claimed in claim 1, wherein the touch panel further comprises a plurality of driving circuits and a plurality of sensing circuits, and the step of scanning the plurality of electrode pairs along the first impedance direction to obtain the plurality of electrical signals for determining the first coordinate of the touch spot comprises the sub-steps of:

inputting a pulse signal $V_0$ into each of the plurality of electrode pairs by the plurality of driving circuits;

detecting a plurality of voltage values $V_p$ by the plurality of sensing circuits 130 to obtain a plurality of resistance-capacitance values RC;

imitating an electrical signal curve according to the plurality of resistance-capacitance values RC; and determining the first coordinate of the touch spot by the electrical signal curve.

3. The method as claimed in claim 1, wherein the touch panel further comprises a plurality of driving circuits and a plurality of sensing circuits, and the step of scanning the plurality of electrode pairs along the first impedance direction to obtain the plurality of electrical signals for determining the first coordinate of the touch spot comprises the sub-steps of:

inputting a pulse signal $V_0$ into each of the plurality of electrode pairs by the plurality of driving circuits;

detecting a plurality of voltage values $V_p$ by the plurality of sensing circuits to obtain a plurality of resistance-capacitance values RC; and determining the first coordinate of the touch spot by an interpolation method.

4. The method as claimed in claim 2, wherein a relationship between the plurality of voltage values $V_p$ and the plurality of resistance-capacitance values RC satisfies a formula $$V_p = V_0 \times \left(1 - e^{-\frac{t}{RC}}\right).$$

5. The method as claimed in claim 2, wherein the step of selecting a plurality of electrode pairs near the first coordinate to obtain the electrode pair signal $P_{sum}$ comprises the sub-steps of:

selecting a plurality of electrode pairs near the first coordinate;

transforming the plurality of voltage values $V_p$ of the plurality of selected electrode pairs into a plurality of electric quantity values $Q_p$ by a formula $Q_p = C' \times V_p$; and summing the plurality of electric quantity values $Q_p$ to obtain the electrode pair signal $P_{sum}$, wherein the C' is a capacitance value of the plurality of sensing circuits.

6. The method as claimed in claim 2, wherein the step of selecting the plurality of electrode pairs near the first coordinate to obtain the electrode pair signal $P_{sum}$ further comprises the sub-steps of:

selecting the plurality of electrode pairs near the first coordinate; and summing the plurality of voltage values $V_p$ of the plurality of selected electrode pairs to obtain the electrode pair signal $P_{sum}$.

7. The method as claimed in claim 3, wherein the step of determining the first coordinate of the touch spot by the interpolation method comprises determining the first coordinate of the touch spot with the plurality of resistance-capacitance values RC and a plurality of first coordinates of the plurality of electrode pairs by an interpolation method.

8. The method as claimed in claim 1, wherein three electrode pairs near the first coordinate are selected.

9. The method as claimed in claim 1, wherein the touch panel further comprises a plurality of driving circuits and a plurality of sensing circuits, and the step of scanning first driving electrodes of the plurality of selected electrode pairs to obtain the first signal $M_{sum}$ comprises the sub-steps of:

inputting a pulse signal $V_0$ into each of first driving electrodes of the plurality of selected electrode pairs by the plurality of driving circuits;

detecting a plurality of voltage values $V_M$ by the plurality of sensing circuits; and summing the plurality of voltage values $V_M$ to obtain the first signal $M_{sum}$.

10. The method as claimed in claim 1, wherein the touch panel further comprises a plurality of driving circuits and a plurality of sensing circuits, and the step of scanning first driving electrodes of the plurality of selected electrode pairs to obtain the first signal $M_{sum}$ comprises the sub-steps of:

inputting a pulse signal $V_0$ into the first driving electrodes of the plurality of selected electrode pairs by the plurality of driving circuits;

detecting a plurality of voltage values $V_M$ by the plurality of sensing circuits;

transforming the plurality of voltage values $V_M$ into a plurality of electric quantity values $Q_M$ by a formula $Q_M = C' \times V_M$; and summing the plurality of electric quantity values $Q_M$ to obtain the first signal $M_{sum}$, wherein the C' is a capacitance value of the plurality of sensing circuits.

11. The method as claimed in claim 1, wherein the touch panel further comprises a driving circuit and a sensing circuit, and the step of scanning first driving electrodes of the plurality of selected electrode pairs to obtain the first signal $M_{sum}$ comprises the sub-steps of:

electrically connecting the first driving electrodes of the plurality of selected electrode pairs to the driving circuit and the sensing circuit;

inputting a pulse signal $V_0$ into the first driving electrodes of the plurality of selected electrode pairs by the driving circuit at the same time;

detecting a voltage value $V_M$ by the sensing circuit; and transforming the voltage value $V_M$ into an electric quantity values $Q_M$ by a formula $Q_M = C' \times V_M$ to obtain the first signal $M_{sum}$, wherein the first signal $M_{sum}$ is equal to the electric quantity values $Q_M$, and the C' is a capacitance value of the sensing circuit.

12. The method as claimed in claim 1, wherein the touch panel further comprises a plurality of driving circuits and a plurality of sensing circuits, and the step of scanning the first driving electrodes of the plurality of selected electrode pairs to obtain the first signal $M_{sum}$ comprises the sub-steps of:

electrically connecting each first driving electrode of the plurality of selected electrode pairs to each of the plurality of driving circuits and the sensing circuits;

inputting a pulse signal $V_0$ into each first driving electrode of the plurality of selected electrode pairs by the plurality of driving circuits one by one;

detecting a plurality of voltage values $V_M$ by the plurality of sensing circuits;

transforming the plurality of voltage values $V_M$ into a plurality of electric quantity values $Q_M$ by a formula $Q_M = C' \times V_M$; and summing the plurality of electric quantity values $Q_M$ to obtain the first signal $M_{sum}$, wherein the C' is a capacitance value of the sensing circuit.

13. The method as claimed in claim 1, wherein the touch panel further comprises a plurality of driving circuits and a plurality of sensing circuits, and the step of scanning first driving electrodes of the plurality of selected electrode pairs to obtain the first signal $M_{sum}$ comprises the sub-steps of:

electrically connecting adjacent two first driving electrodes of the plurality of selected electrode pairs to each of the plurality of driving circuits and the sensing circuits;

inputting a pulse signal $V_0$ into the adjacent two first driving electrode of the plurality of selected electrode pairs by the plurality of driving circuits one by one;

detecting a plurality of voltage values $V_M$ by the plurality of sensing circuits;

transforming the plurality of voltage values $V_M$ into a plurality of electric quantity values $Q_M$ by a formula $Q_M = C' \times V_M$; and summing the plurality of electric quantity values $Q_M$ to obtain the first signal $M_{sum}$, wherein the C' is capacitance values of the plurality of sensing circuit.

14. The method as claimed in claim 1, wherein the touch panel further comprises a plurality of driving circuits and a plurality of sensing circuits, and the step of scanning second driving electrodes of the plurality of selected electrode pairs to obtain the second signal $N_{sum}$ comprises the sub-steps of:

inputting a pulse signal $V_0$ into the second driving electrodes of the plurality of selected electrode pairs by the plurality of driving circuits;

detecting a plurality of voltage values $V_N$ by the plurality of sensing circuits; and summing the plurality of voltage values $V_N$ to obtain the second signal $N_{sum}$.

15. The method as claimed in claim 1, wherein the touch panel further comprises a plurality of driving circuits and a plurality of sensing circuits, and the step of scanning second driving electrodes of the plurality of selected electrode pairs to obtain the second signal $N_{sum}$ comprises the sub-steps of:

inputting a pulse signal $V_0$ into the second driving electrodes of the plurality of selected electrode pairs by the plurality of driving circuits;

detecting a plurality of voltage values $V_N$ by the plurality of sensing circuits;

transforming the plurality of voltage values $V_N$ into a plurality of electric quantity values $Q_N$ by a formula $Q_N = C' \times V_N$; and summing the plurality of electric quantity values $Q_N$ to obtain the second signal $N_{sum}$, wherein the C' is a capacitance value of the sensing circuit.

16. The method as claimed in claim 1, wherein the touch panel further comprises a driving circuit and a sensing circuits, and the step of scanning second driving electrodes of the plurality of selected electrode pairs to obtain the second signal $N_{sum}$ comprises the sub-steps of:

electrically connecting the second driving electrodes of the plurality of selected electrode pairs to the driving circuit and the sensing circuit;

inputting a pulse signal $V_0$ into the second driving electrodes of the plurality of selected electrode pairs by the driving circuit at the same time;

detecting a voltage value $V_N$ by the sensing circuit; and transforming the voltage value $V_N$ into an electric quantity values $Q_N$ by a formula $Q_N = C' \times V_N$ to obtain the second signal $N_{sum}$, wherein the second signal $N_{sum}$ is equal to the electric quantity values $Q_N$, and the C' is a capacitance value of the sensing circuit.

17. The method as claimed in claim 1, wherein the conductive film is a carbon nanotube film comprising a plurality of successive and oriented carbon nanotubes joined end-to-end by van der Waals force therebetween.

18. The method as claimed in claim 17, wherein the plurality of carbon nanotubes are oriented along the second impedance direction.

19. A method for detecting a touch spot of a touch panel, the touch panel comprising a conductive film and a plurality of electrode pairs, the conductive film defining a first impedance direction and a second impedance direction substantially perpendicular to the first impedance direction, the plurality of electrode pairs being disposed along the first impedance direction, each of the plurality of electrode pairs comprising a first driving electrode and a second driving electrode separately located on two opposite sides of the conductive film, the method comprising:

scanning the plurality of electrode pairs along the first impedance direction to obtain a plurality of electrical signals for determining a first coordinate of the touch spot;

selecting a plurality of electrode pairs near the first coordinate to obtain an electrode pair signal $P_{sum}$;

scanning first driving electrodes of the plurality of selected electrode pairs to obtain a first signal $M_{sum}$;

scanning second driving electrodes of the plurality of selected electrode pairs to obtain a second signal $N_{sum}$; and determining a second coordinate of the touch spot according to the electrode pair signal $P_{sum}$, the first signal $M_{sum}$, and the second signal $N_{sum}$.

* * * * *